United States Patent [19]

Kato

[11] 4,090,806
[45] May 23, 1978

[54] TAPPING SPINDLE HAVING AUTOMATIC DEPTH CONTROL

[76] Inventor: Taizo Kato, 3007-104 Obatahigashijima, Moriyamaku, Nagoya, Japan

[21] Appl. No.: 715,265

[22] Filed: Aug. 18, 1976

[51] Int. Cl.² .................................................. B23G 1/46
[52] U.S. Cl. .................................. 408/139; 10/89 H; 10/89 F; 10/141 H; 408/142
[58] Field of Search ............... 408/139, 142; 10/89 H, 10/89 F, 141 H

[56] References Cited

U.S. PATENT DOCUMENTS

| | | | |
|---|---|---|---|
| 2,684,491 | 7/1954 | Roddick | 408/139 |
| 3,656,858 | 4/1972 | Eriksson | 408/139 |
| 3,999,642 | 12/1976 | Johnson | 408/139 X |

*Primary Examiner*—Z. R. Bilinsky

[57] ABSTRACT

A driven cylinder is rotatably and reciprocatably mounted within a rotatable driving cylinder open at one end. The driving cylinder has a plurality of axial slots formed in its side wall. A clutch sleeve is secured to the driven cylinder inside the driving cylinder and has a plurality of axial grooves adapted to be aligned with the slots. The transverse top wall of the clutch sleeve is sloped upwardly from the leading edge of one groove to the trailing edge of the next groove. Each groove has an inner end opening towards the closed end of the driving cylinder. A ball is rotatably and reciprocatably mounted in the bottom of each groove and a roller is rotatably and reciprocatably mounted in each groove on top of the ball and extending out of the open end of the groove. The ball and roller in each groove also contact the edges of the aligned slot to transmit rotation from the driving to the driven cylinder. The driven cylinder is biased into the driving cylinder while the ball and roller pairs are biased into the bottom of the respective groove.

4 Claims, 4 Drawing Figures

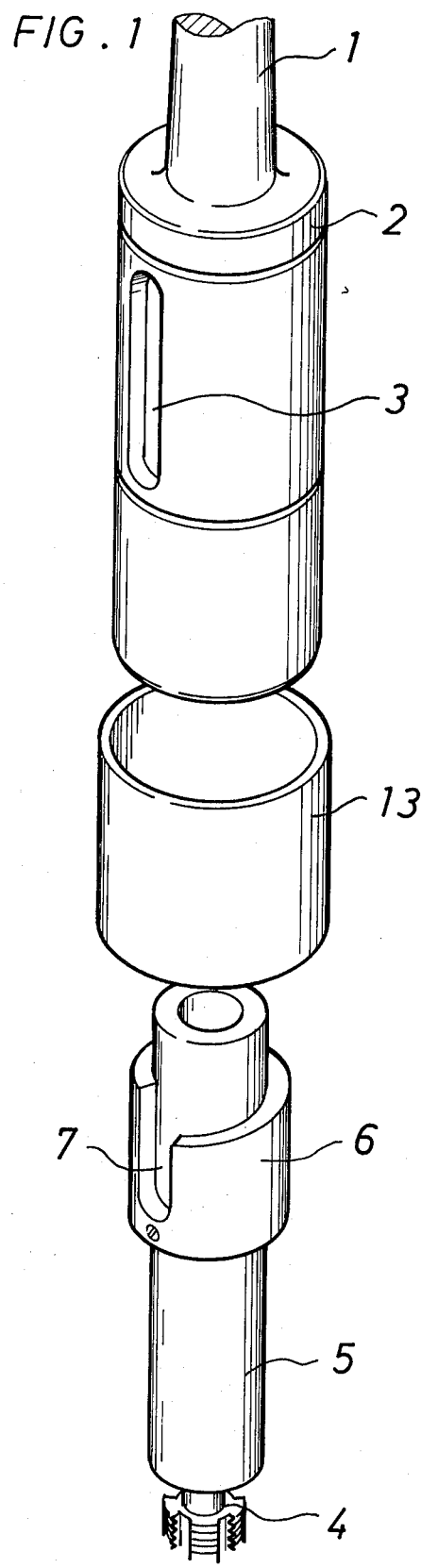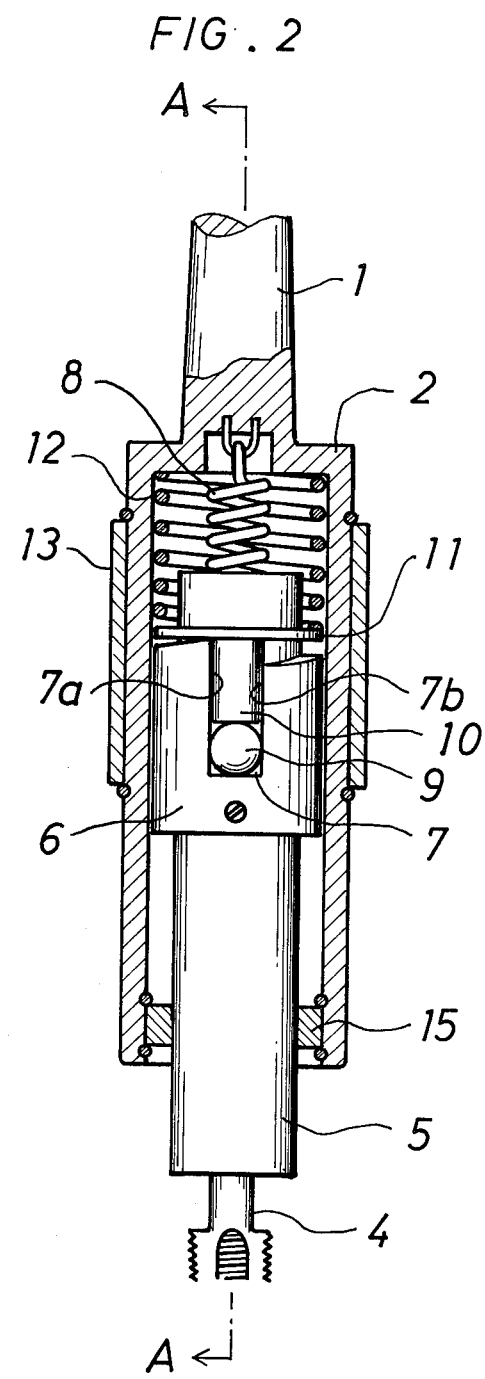

FIG. 3
FIG. 4
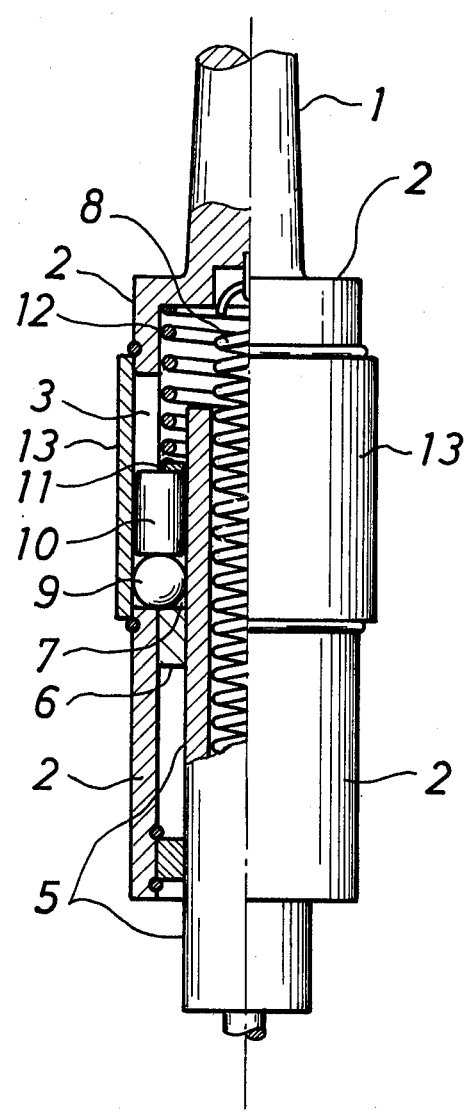
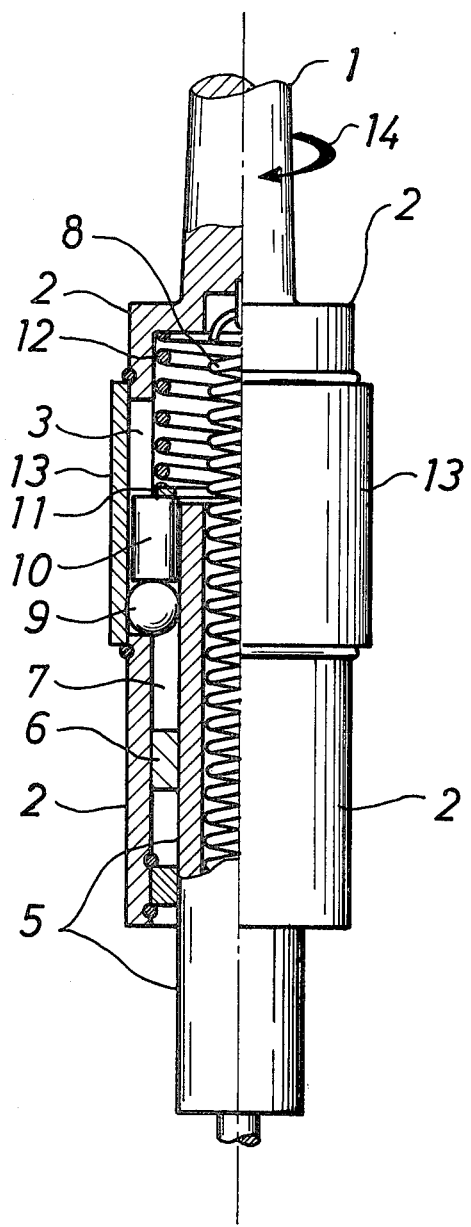

TAPPING SPINDLE HAVING AUTOMATIC DEPTH CONTROL

BACKGROUND OF THE INVENTION

The present invention relates to depth control of thread cutting spindles, and more particularly to depth control of tapping spindles.

Automatic depth control of tapping spindles is exemplified in U.S. Pat. No. 3,791,756 where pins in the spindle stem engage in slots to drive a driven sleeve member. When the tapping progresses to a predetermined depth, this engagement is released to stop the tapping. The bottom sides of the sleeve member have round edges so that the pins will slide along the bottom sides of the sleeve. This produces axial reciprocation even after the spindle stem is stopped since the sleeve is forced toward the pins by a spring and the rotating. Special mechanism or means and undesirable space or length are required for this axial reciprocation, resulting in lengthening of the spindle and restricting acceptable work-pieces to small sizes.

SUMMARY OF INVENTION

An object of the present invention is to provide a thread cutting spindle with depth control.

Another object of the invention is to shorten the depth control spindle by using balls for transferring rotation within a limited space in the spindle.

A thread cutting spindle is provided with first and second cylinders. The first cylinder has at least one axial slot in its side wall and the second cylinder is reciprocatably housed within and biased into the first cylinder. The second cylinder has axial grooves formed in its side wall. The axial groove is open at its inner end and the top sides adjacent the groove open end are beveled. A ball and roller pair are slidably and rotatably positioned in said slot and groove and are biased towards the bottoms of the slot and groove away from the open end of the groove to couple the first and second cylinders together so that the ball disengages from the groove when tapping work proceeds to a certain depth and moves the cylinders axially apart.

BRIEF DESCRIPTION OF THE DRAWINGS

The invention must be understood when considered in light of the following detailed description taken in conjunction with the accompanying drawings, wherein:

FIG. 1 is an exploded, perspective view of the embodiment of this invention showing its parts;

FIG. 2 is a longitudinal, cross-sectional view of the embodiment shown in FIG. 1; and, FIGS. 3 and 4 are longitudinal partly cross-sectional views taken along the line A—A of FIG. 2, FIG. 3 showing the contracted position and FIG. 4 showing the expanded position.

DETAILED DESCRIPTION OF THE DRAWING

A driven cylinder 5 is rotatably and reciprocatably mounted within a rotatable driving cylinder 2 open at one end. The driving cylinder 2 has a plurality of axial slots 3 formed in its side wall. A clutch sleeve 6 is secured to the driven cylinder 5 inside the driving cylinder 2 and has a plurality of axial grooves 7 adapted to be aligned with the slots 3. The transverse top wall of the clutch sleeve 6 is sloped upwardly from the leading edge 7B of one groove to the trailing edge 7A of the next groove. Each groove 7 has an inner end opening towards the closed end of the driving cylinder 2. A ball 9 is rotatably and reciprocatably mounted in the bottom of each groove 7 and a roller 10 is rotatably and reciprocatably mounted in each groove 7 on top of the ball 9 and extending out of the open end of the groove 7. The ball 9 and roller 10 in each groove 7 also contact the edges of the aligned slot 3 to transmit rotation from the driving to the driven cylinder. The driven cylinder 5 is biased into the driving cylinder 2 while the ball 9 and roller 10 are biased into the bottom of the respective grooves 7.

Specifically, a shank 1 is formed integrally with a driving cylinder or sleeve 2. Axial slots 3 are formed in the side wall of the cylinder 2, preferably at regular intervals. A tap 4 is attached to a hollow, tabular driven cylinder 5 at the end of the cylinder 5 remote from the shank 1. A clutch member 6 is secured, by a screw or the like, to the inner portion to the driven cylinder 5. The clutch member 6 is formed with axial grooves 7 corresponding to the cylinder slots 3 and which are open at the top end towards the shank 1. The top sides of clutch sleeve 6 are sloped or angled in one direction of rotation between the grooves 7, as shown in FIGS. 1 and 2.

The driven cylinder 5 is positioned in the driving cylinder 2 with the slots 3 aligned with the grooves 7 so that a ball 9 and roller 10 set may be positioned to move axially in each passage defined by each aligned groove 7 and slot 3. A tension spring 8 extends through the hollow inside of the cylinder 5 and is secured between the ceiling of the cylinder 2 and the bottom of cylinder 5 remote from the shank 1.

A ring or washer 11 is mounted to surround the cylinder 5 and rest on top of the rollers 10. The rollers 10 slide and rotate freely under the ring 11. A compression spring 12 is secured between the ceiling of the cylinder 2 and the ring 11 so that the ring 11 presses on the rollers 10 so that the balls 9 ride against the bottom of the slots 3 in the drive cylinder 2. A protective cylinder 13 is mounted on the driving cylinder 2, between a pair of snap rings or the like, surrounding the slots 3 to hold the balls 9 and the rollers 10 within the aligned slots 3 and grooves 7. A bearing 15 surrounds the outer end of the driven cylinder 5 to provide for aligned rotation within the driving cylinder 2.

The relative forces of springs 8 and 12 are selected so that the balls 9 rest in the bottoms both of the slots 3 and grooves 7 before tapping starts, as is shown in FIG. 3. When tapping begins, the driving cylinder 2 transmits rotational force to the driven cylinder 5 through the balls 9 engaging the slots 3 and grooves 7 to rotate the tap 4. As tapping progresses, the driven cylinder 5 and clutch 6 are pulled away from the shank 1. The balls 9 under the pins 10 are held in position against the bottom of slots 3, as is shown in FIG. 4, by the ring 11 while the grooves 7 move away. Finally, the balls will disengage from the grooves 7 and knock or slide up over the angled top sides of the clutch 6 against the force of spring 12. In this condition, the driven cylinder 5 will no longer be driven and will stop the tapping while the driving cylinder 2 will continue to rotate. The tapping depth is thus determined by the depth of the leading edges of the grooves 7.

It will be understood that during the idling, neither cylinders 2 or 5 are moving in the axial direction while the balls 9, rollers 10 and ring 11 will vibrate axially. This eliminates the necessity of undesirable mechanisms and space for the cylinder itself to axially vibrate as required by the prior art. This all results in a shortened spindle.

Reverse rotation of the cylinder 2, indicated by arrow 14 in FIG. 4, causes the balls to again engage the acute shoulders of the grooves 7 under the force of springs 8 and 12, thereby rotating the cylinder 5 in the reverse direction so that the tap 4 is threaded back from the work and the cylinder 5 moves back towards the shank 1.

Although a detailed embodiment of the invention has been disclosed herein, various other configurations and dimensions could be employed all within the scope of the claims. Consequently, the specific details disclosed herein describe the best presently known basis for the claims herein which define the scope of the invention.

What is claimed is:

1. A thread cutting spindle, comprising:

first and second cylinders, said first cylinder having at least one axial slot in the side wall thereof and said second cylinder being reciprocatably housed in said first cylinder and having at least one axial groove, said groove having an open inner end and the top sides of said second cylinder adjacent said open end being beveled; and, at least one ball and roller pair slidably positioned in said slot and groove to couple the first and second cylinders together so that the ball will disengage from the groove when tapping work proceeds to a predetermined depth to move the cylinders axially apart, said second cylinder being biased into said first cylinder while said ball and roller are biased toward the bottoms of said slot and groove away from the open end of said groove.

2. A thread cutting spindle, comprising:

driving and driven cylinders, said driving cylinder having at least one longitudinal slot in a side wall and said driven cylinder having at least one longitudinal groove in a side wall, said groove being open at the inner end and said driven cylinder having angled top sides adjacent said groove open end, said driven cylinder bieng reciprocatably housed in said driving cylinder so that said slot and groove are aligned; and, at least one ball and roller pair slidably positioned in said aligned slot and groove to couple said driving and driven cylinders so that the ball will disengage from said groove as the driven cylinder moves away from the driving cylinder after tapping has progressed to a predetermined depth, said driven cylinder being spring-loaded into said driving cylinder while said ball and roller are spring-loaded against the bottom of the slot away from the open end of said groove.

3. A thread cutting spindle, comprising:

a rotatable driving cylinder having a hollow bore extending into the driving cylinder from a first end and having a shaft secured to a closed second end of the driving cylinder opposite the open end, said driving cylinder having a plurality of elongated axial slots formed in the side wall of the driving cylinder;

a hollow tubular driven cylinder slidably and rotatably mounted within the bore of the driving cylinder;

a first spring connecting the driving and driven cylinders to bias the driven cylinder into the driving cylinder to a predetermined axial position;

a clutch sleeve secured to the driven cylinder inside the driving cylinder, said clutch sleeve having a plurality of elongated axial grooves formed in the side wall of the clutch sleeve, said axial grooves being adapted to be aligned with respective ones of the axial slots of the driving cylinder, each of said grooves being open at the inner end of the groove, said clutch sleeve having its top transverse surface sloped upwardly from the leading edge of one groove to the trailing edge of the next adjacent groove;

rotatable means mounted in said plurality of aligned slots and grooves, each rotatable means being adapted to engage sides of both the aligned groove and slot of the respective pair to transmit rotational motion from the driving cylinder to the driven cylinder, said rotatable means being adapted to rotate within said respective aligned groove and slot pair and to slide axially within said respective aligned groove and slot pair;

means for maintaining said rotatable means within the respective slot; and, means for biasing said rotatable means away from the open end of the respective groove;

whereby the driven cylinder is adapted to slide towards the open end of the driving cylinder as tapping work progresses thereby pulling the clutch sleeve in the same direction so that the rotatable means will slide up over the sloped top transverse surface of the clutch sleeve and out of said grooves to disengage the driven and driving cylinders when the tapping work has progressed to a depth which will have moved the clutch sleeve a distance equal to the length of the grooves at their leading edge, and upon reverse rotation of the driving cylinder the rotatable means will engage the previously trailing edges of the grooves to rotate the driven cylinder in said reverse direction.

4. A spindle as defined in claim 3, wherein:

said rotatable means each comprises a ball positioned in the bottom of each aligned slot and groove pair; and, said means for biasing said rotatable means comprises a roller positioned on top of said ball and projecting out of the open end of the groove, a ring slidably mounted over the inward end of said driven cylinder and bearing against the projecting end of each roller, and a spring biasing said ring against the top of the roller.

* * * * *